(12) United States Patent
de Vulpilliéres et al.

(10) Patent No.: US 10,273,016 B2
(45) Date of Patent: Apr. 30, 2019

(54) NACELLE FOR AN AIRPLANE TURBOJET

(71) Applicant: SNECMA, Paris (FR)

(72) Inventors: Eric de Vulpilliéres, Moissy Cramayel (FR); Gaétan Jean Mabboux, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 300 days.

(21) Appl. No.: 15/114,554

(22) PCT Filed: Jan. 26, 2015

(86) PCT No.: PCT/FR2015/050175
§ 371 (c)(1),
(2) Date: Jul. 27, 2016

(87) PCT Pub. No.: WO2015/114241
PCT Pub. Date: Aug. 6, 2015

(65) Prior Publication Data
US 2016/0340052 A1 Nov. 24, 2016

(30) Foreign Application Priority Data
Jan. 29, 2014 (FR) ...................... 14 50687

(51) Int. Cl.
*B64D 29/06* (2006.01)
*F02K 1/72* (2006.01)
(Continued)

(52) U.S. Cl.
CPC ............. *B64D 29/06* (2013.01); *B64D 27/16* (2013.01); *F02C 7/20* (2013.01); *F02K 1/60* (2013.01);
(Continued)

(58) Field of Classification Search
CPC ........... B64D 27/16; B64D 29/06; F02C 7/20; F02K 1/60; F02K 1/72; F02K 1/80;
(Continued)

(56) References Cited

U.S. PATENT DOCUMENTS 4,194,692 A * 3/1980 Dickenson ............. F02K 1/002
239/265.33
4,238,092 A * 12/1980 Brennan ................... F02K 1/00
244/54
(Continued)

FOREIGN PATENT DOCUMENTS

EP 0043764 A1 1/1982
FR 2 704 907 A1 11/1994
(Continued)

*Primary Examiner* — Medhat Badawi
(74) *Attorney, Agent, or Firm* — Blank Rome LLP

(57) ABSTRACT

The invention relates to a nacelle (1) for an aircraft turbojet, the nacelle comprising a frustoconical radially outer annular wall (13), a pylon (9) extending radially outwards from said annular wall, the pylon (9) being designed to fasten the nacelle (1) to a fixed portion of the airplane, said nacelle being characterized in that it is provided with at least one projecting zone (22) extending radially outwards from the frustoconical outer wall (13), said projecting zone (22) being situated in the vicinity of a downstream annular edge (14) of said outer wall (13) and in the vicinity of the pylon (9).

12 Claims, 3 Drawing Sheets

(51) Int. Cl.
  *F02K 1/60* (2006.01)
  *F02K 1/80* (2006.01)
  *F02C 7/20* (2006.01)
  *B64D 27/16* (2006.01)

(52) U.S. Cl.
  CPC ................. *F02K 1/72* (2013.01); *F02K 1/80* (2013.01); *F05D 2220/323* (2013.01); *F05D 2240/14* (2013.01); *F05D 2250/241* (2013.01); *F05D 2250/26* (2013.01); *F05D 2250/61* (2013.01); *F05D 2250/711* (2013.01)

(58) Field of Classification Search
  CPC ........... F05D 2220/323; F05D 2240/14; F05D 2250/241; F05D 2250/26; F05D 2250/61; F05D 2250/711
  See application file for complete search history.

(56) References Cited

U.S. PATENT DOCUMENTS

| | | | | |
|---|---|---|---|---|
| 4,298,089 A * | 11/1981 | Birch | F02K 1/386 | 181/213 |
| 4,407,120 A * | 10/1983 | Timms | F02K 1/72 | 239/265.29 |
| 4,410,152 A * | 10/1983 | Kennedy | F02K 1/563 | 239/265.27 |
| 4,447,028 A * | 5/1984 | Wang | B64C 9/00 | 244/207 |
| 4,865,256 A * | 9/1989 | Durand | F02K 1/11 | 239/265.29 |
| 5,529,263 A * | 6/1996 | Rudolph | B64C 30/00 | 244/15 |
| 5,598,990 A * | 2/1997 | Farokhi | B64C 23/06 | 244/198 |
| 5,775,097 A * | 7/1998 | Lardy | F02K 1/60 | 239/265.37 |
| 6,151,883 A * | 11/2000 | Hatrick | F02K 1/72 | 239/265.29 |
| 7,870,722 B2 * | 1/2011 | Birch | F02K 1/30 | 239/265.17 |
| 8,839,601 B2 * | 9/2014 | Chapelain | F02K 1/70 | 239/265.19 |
| 9,573,695 B2 * | 2/2017 | Suciu | F01D 25/28 | |
| 9,581,108 B2 * | 2/2017 | Suciu | F02K 1/62 | |
| 2005/0229584 A1 * | 10/2005 | Tweedie | F02K 1/72 | 60/226.1 |
| 2009/0200418 A1 * | 8/2009 | Beaufort | B64D 27/26 | 244/54 |
| 2010/0163671 A1 * | 7/2010 | Svensson | B64D 27/26 | 244/54 |
| 2011/0079679 A1 * | 4/2011 | Journade | B64C 11/48 | 244/54 |
| 2011/0168837 A1 * | 7/2011 | Balk | B64D 27/26 | 244/54 |
| 2012/0023900 A1 * | 2/2012 | Flin | B64D 29/06 | 60/226.2 |
| 2012/0137655 A1 * | 6/2012 | Pero | F02K 1/70 | 60/204 |
| 2012/0325325 A1 * | 12/2012 | Quackenbush | F02C 7/04 | 137/1 |
| 2016/0169158 A9 * | 6/2016 | Ramlaoui | F02K 1/763 | 239/265.19 |
| 2016/0208739 A1 * | 7/2016 | Aten | F02K 1/72 | |
| 2017/0328306 A1 * | 11/2017 | Chmielewski | F01D 25/24 | |

FOREIGN PATENT DOCUMENTS

| | | |
|---|---|---|
| FR | 2 741 114 A1 | 5/1997 |
| FR | 2 970 520 A1 | 7/2012 |

\* cited by examiner

NACELLE FOR AN AIRPLANE TURBOJET

The present invention relates to a nacelle for an airplane turbojet.

An airplane turbojet is conventionally housed in a nacelle of tubular structure, the nacelle having an air intake situated upstream from the turbojet, a middle segment surrounding a fan of the turbojet, and a downstream segment including thrust reversal means.

Present-day nacelles are designed to house a dual-flow turbojet or "turbofan" suitable for generating a primary air flow and a secondary air flow, the primary air flow passing through the fan, a low-pressure compressor, a high-pressure compressor, a combustion chamber, a high-pressure turbine, and a low-pressure turbine in succession, and then being ejected via a nozzle, and the secondary air flow passing through the fan and flowing outside the turbojet in a stream flowing along an annular course.

That course is delimited externally by an Outer Fixed Structure (OFS) of the nacelle, and internally by a concentric Inner Fixed Structure (IFS).

As is known, in particular from Documents FR 2 970 520, FR 2 741 114, and FR 2 704 907, the outer structure may have one or more doors suitable for being moved, under the action of drive means such as actuators, to go between a closed inactive position in which the doors remain while the turbojet is operating in "direct thrust" mode, and in which they extend in continuity with the outer surface of the outer structure, and an open or thrust reversal position into which said doors go so that a downstream portion of each door comes to close off, at least partially, the course of the stream of the secondary flow, and so that an upstream portion of each door opens up a passageway in the outer structure, enabling the secondary flow to be forced radially outwards and/or upstream.

The outer structure is connected to a fixed portion of the airplane (wing, fairing) via a pylon extending radially outwards. The pylon is generally streamlined in axial section.

It has been observed that the presence of the pylon disturbs the flow of air outside the outer structure. In particular, boundary layer separation can occur in the zones situated in the vicinity of the pylon and of the downstream edge of the outer structure.

In addition, the doors are hinged to a fixed portion of the outer structure, at side pivots situated in the vicinity of the downstream edge (also known as the "trailing edge") of the outer structure of the nacelle. In particular, the outer structure has an inner wall and an outer wall that are frustoconical and that meet at the downstream edge.

Therefore, the more the pivots are housed in the vicinity of the downstream edge, the more difficult it is to house them in the space situated between the frustoconical inner and outer walls of the outer structure.

An object of the invention is to provide a solution to the above-mentioned problems that is simple, effective, and inexpensive.

To this end, the invention provides a nacelle for an aircraft turbojet, the nacelle comprising a frustoconical radially outer annular wall, a pylon extending radially outwards from said annular wall, the pylon being designed to fasten the nacelle to a fixed portion of the airplane, said nacelle being characterized in that it is provided with at least one projecting zone extending radially outwards from the frustoconical outer wall, said projecting zone being situated in the vicinity of a downstream annular edge of said outer wall and in the vicinity of the pylon.

The projecting zone, e.g. in the form of a rounded projection, forms a local deformation of the smooth and frustoconical outer surface. This projecting zone may be in the shape of a portion of a sphere, or have an ovoid shape, or more generally a shape defining a convex outer surface and having continuity of tangents, this outer surface preferably being free of any sharp edges. The presence of such a projecting zone makes it possible to reduce the zone of separation of the boundary layer, in such a manner as to improve the overall air-flow performance.

Advantageously, the pylon has a streamlined section at its zone attached to the outer wall, said streamlined section extending along the axis of the nacelle.

In which case, the axial distance between the projecting zone, e.g. the center of said projecting zone, and the downstream edge of the outer wall lies in the range $0.3 \times M$ to $2 \times M$, where M is the maximum cross-section or maximum width of the streamlined section of the pylon at its zone attached to the outer wall.

In addition, the distance between the projecting zone, e.g. the center of said projecting zone, and the pylon may lie in the range $0.15 \times M$ to $0.8 \times M$, and preferably in the range $0.2 \times M$ to $0.7 \times M$, where M is the maximum cross-section or maximum width of the streamlined section of the pylon at its zone attached to the outer wall.

In addition, the maximum height of the projecting zone, along the normal to the frustoconical outer surface may lie in the range $0.03 \times M$ to $0.15 \times M$, where M is the maximum cross-section or maximum width of the streamlined section of the pylon at its zone attached to the outer wall.

Preferably, the length of the projecting zone, i.e. the axial distance of said projecting zone, lies in the range $0.2 \times M$ to M, where M is the maximum cross-section or maximum width of the streamlined cross-section of the pylon at its zone attached to the outer wall.

Preferably, the width of the projecting zone, i.e. the distance along the circumferential direction of said projecting zone, may lie in the range $0.1 \times M$ to $0.5 \times M$, where M is the maximum cross-section or maximum width of the streamlined cross-section of the pylon at its zone attached to the outer wall.

The nacelle may also have at least two projecting zones, situated circumferentially on either side of the pylon.

According to a characteristic of the invention, the nacelle has thrust reversal means comprising at least one door mounted to pivot about at least one hinge relative to a fixed portion of the nacelle, said hinge being housed between the outer wall and an inner wall of the nacelle, facing the projecting zone.

The projecting zone makes it possible to increase the space available between the inner and outer surfaces for housing the hinge. This makes it easier to house a hinge of larger dimensions and/or to house such a hinge in the vicinity of the downstream edge of the outer surface.

Said outer wall and said inner wall may be frustoconical and may meet at their downstream edges.

The side surface of the pylon in the vicinity of the projecting zone may have a substantially plane or convex shape, down to the downstream edge of the outer wall.

The two side edges of the pylon may meet at an axial position substantially at the level of the axial position of the downstream edge of said outer wall.

The invention will be better understood other details, characteristics, and advantages of the invention will appear on reading the following description given by way of non-limiting example and with reference to the accompanying drawings, in which.

Figure 1:
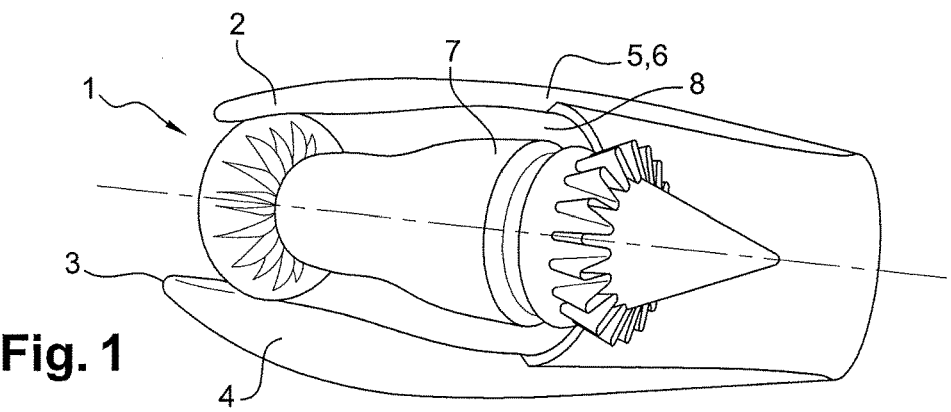
FIG. 1 is a diagrammatic fragmentary axial section view of a prior art nacelle.

FIGS. 1 to 5 show a prior art nacelle 1, of tubular shape and of axis A. The nacelle 1 has an upstream segment 2 provided with an annular intake lip 3 delimiting an air intake, a middle segment 4 designed to surround a fan of an airplane turbojet, and a downstream segment 5. The downstream segment 5 conventionally has radially outer and inner structures 6 and 7, referred to respectively as the "Outer Fan Duct" or "Outer Fixed Structure" (OFS) and as the "Inner Fan Duct" or Inner Fixed Structure (IFS)). The outer and inner structures 6 and 7 co-operate to delimit between them an annular course for a stream 8 constituted by a "secondary" air flow.

The outer structure 6 has thrust reversal means and is connected to a fixed portion of the airplane, such as, for example a wing or fairing, via a pylon 9 (FIGS. 4 to 9).

Figure 2:
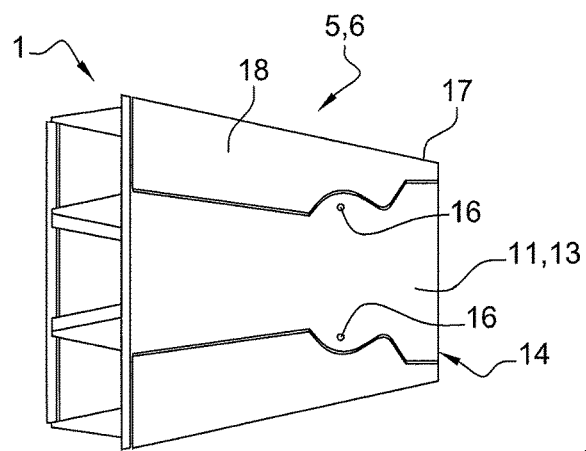
FIG. 2 is a side view of a downstream portion of the prior art nacelle, showing the doors of the thrust reversal means in the closed position.
Figure 3:
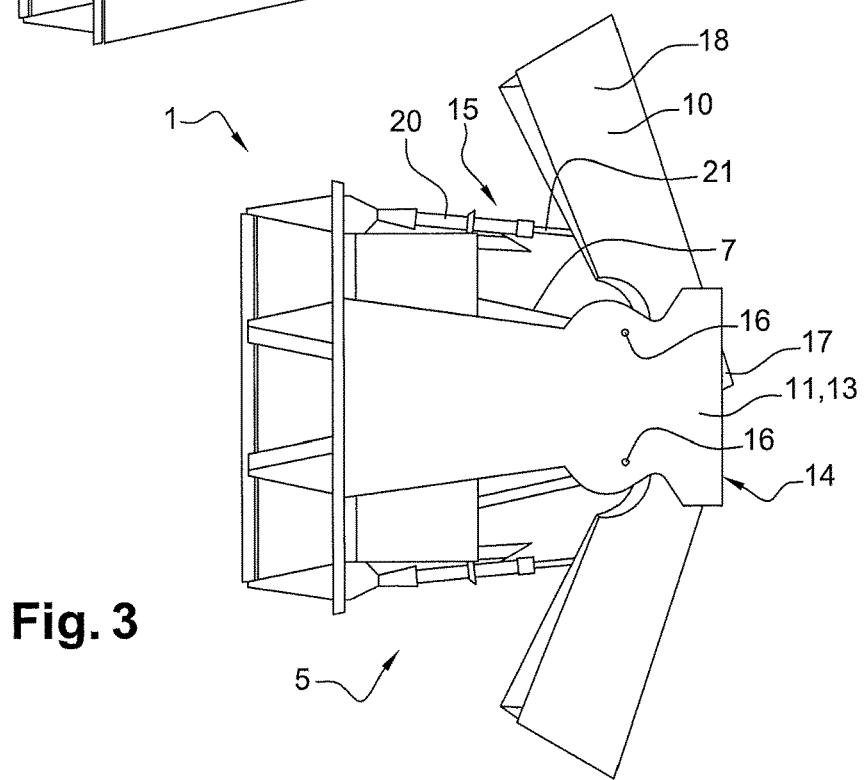
FIG. 3 is a view corresponding to FIG. 2, and showing the doors in the open position.
Figure 4:
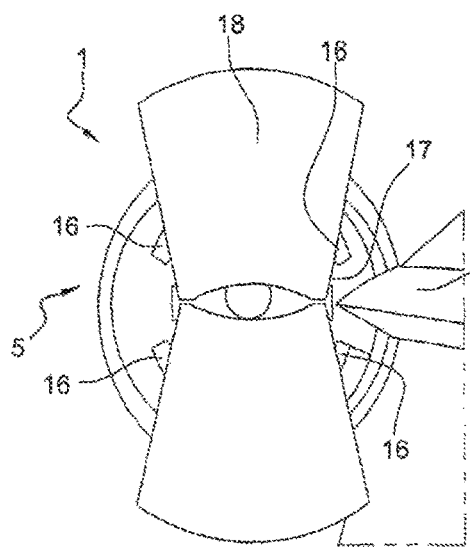
FIG. 4 is a view seen from downstream of the prior art nacelle, showing the doors in the open position.

As can be seen more clearly in FIGS. 2 to 4, the thrust reversal means comprise two doors 10 mounted to pivot on a fixed portion 11 of the outer structure 6.

Figure 10:
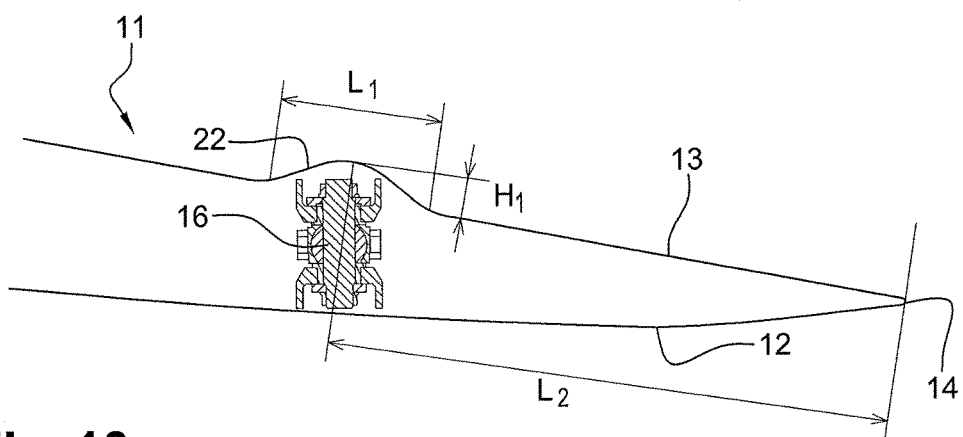
FIG. 10 is a diagrammatic axial section view of a downstream portion of the nacelle of the invention.

The fixed portion 11 of the outer structure has an inner surface 12 and an outer surface 13 that are frustoconical and that meet at their downstream edges 14, as can be seen more clearly in FIG. 10 in relation to the invention. The fixed portion 11 is provided with openings 15 (FIG. 3) in which the doors 10 are mounted.

Each door 10 has an outer surface in the general shape of an angular sector of a truncated cone, of shape complementary to the corresponding opening 15, and is mounted to pivot via two hinges 16 situated on either side of the corresponding door 10. Each door 10 has a downstream portion 17 and an upstream portion 18.

Each door 10 is moved by an actuator having a body 20 hinged to the fixed portion 11 of the outer structure 6, and a moving rod 21 mounted to move relative to the body 20, the free end of the rod 21 being hinged to a middle zone of the door 10 (FIG. 3).

In operation, the doors 10 are suitable for pivoting between a closed or inactive position, shown in FIG. 2, in which the doors 10 extend in alignment with the frustoconical outer surface 13 of the outer structure 6, and an open or thrust reversal position, into which said doors 10 go so that the downstream portion 17 of each door 10 comes to close off, at least partially, the course of the stream 8 of the secondary flow, and so that the upstream portion 18 of each door 10 opens the corresponding opening 15 in the outer structure 6 so as to enable the secondary flow to be forced radially outwards and/or upstream.

Figure 5:
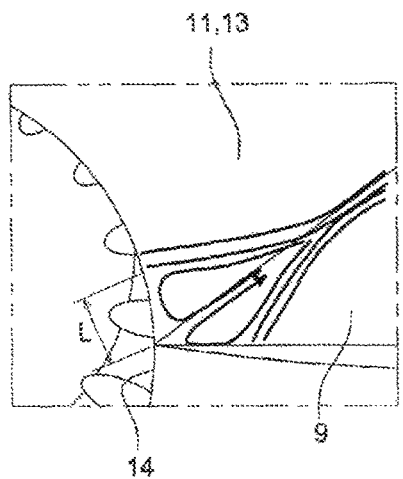
FIG. 5 is a detail perspective view, showing a downstream zone of the prior art nacelle.

As shown in FIG. 5, the presence of the pylon 9 disturbs the flow of air (shown by arrows) outside the outer structure 6. In particular, boundary layer separation can occur in the zones situated in the vicinity of the pylon 9 and of the downstream edge 14 of the outer structure 6. Each of the separation zones has a dimension referenced L in FIG. 5.

In order to reduce the dimensions L of the separation zones, the invention makes provision to modify the shape of the outer wall 13 so that it has domed zones 22 projecting radially outwards from the base frustoconical surface 13. In particular, the outer surface 13 has two domed zones 22 situated circumferentially on either side of the pylon 9, in the vicinity of the pylon 9 and of the downstream edge 14 of the outer surface 13. Each projecting zone 22 has, for example, the shape of a portion of a sphere or of a portion of an ellipsoid. By way of an alternative, it is possible for the sphere portion shape or ellipsoid portion shape to be streamlined downstream like a drop of water.

M represents the maximum cross-section (or maximum width) of the streamlined section of the pylon 9 in its zone that is attached to the outer wall 13.

The maximum height H1 of each projecting zone 22, along the normal to the frustoconical outer surface 13 lies in the range 0.03×M to 0.15×M. The length L1 of each projecting zone 22, i.e. the axial distance of each projecting zone 22, lies in the range 0.2×M to M. The width l1 of each projecting zone 22, i.e. the distance along the circumferential direction of each projecting zone 22, lies in the range 0.1×M to 0.5×M.

The center of a projecting zone 22 is defined as being the middle of the projecting zone in the circumferential direction at the place where the above-mentioned width l1 is at its maximum. For example, if the projecting zone has the shape of a portion of a sphere or of a portion of an ellipsoid, its center in the meaning of the present invention corresponds to the projection of the geometrical center of the shape in question onto the outer surface 13 in a radial direction relative to the axis of the nacelle.

The axial distance L2 between the center of each projecting zone 22 and the downstream edge 14 of the outer wall 13 lies in the range 0.3×M to 2×M. In addition, the distance H2 between the center of each projecting zone 22 and the corresponding side edge (or corresponding side surface) of the pylon 9 lies in the range 0.15×M to 0.8×M.

Figure 9:
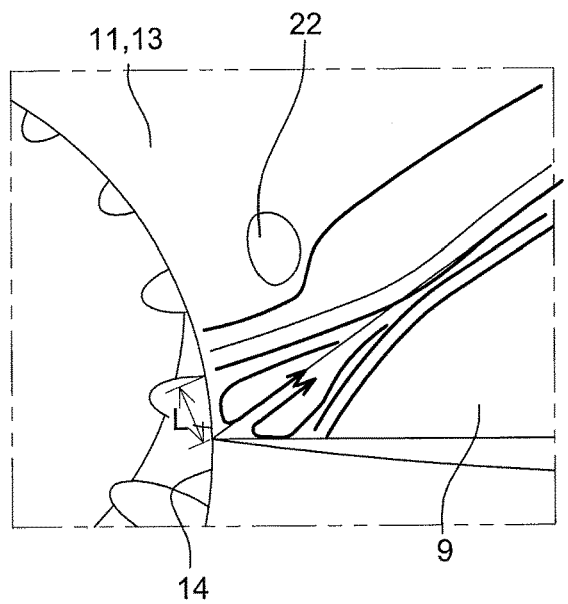
FIG. 9 is a view corresponding to FIG. 5, and showing the nacelle of the invention.

This range of values is particularly advantageous for generating a constriction in the passageway for air at the boundary layer between a projecting zone 22 and the side surface that forms the corresponding side edge of the pylon 9. The boundary layer passing through this constriction is thus subjected to relative compression, thereby causing the zones in which the stream of air separates from the side surface of the pylon and from the outer surface 13 to be pushed away downstream, as shown in FIG. 9. Advantageously, in the vicinity of the projecting zone 22, the side surface of the pylon 9 has a substantially plane or indeed slightly convex shape, down to the downstream edge 14 of the outer wall 13, so as to facilitate the flow of air while minimizing the disturbance along the side edge of the pylon.

As is shown in FIG. 9, by means of the above-mentioned relative constriction in the passageway for the air, the projecting zones 22 make it possible to reduce the dimensions L of the separation zones, in such a manner as to improve the overall air-flow performance. In particular, the reduction in the drag coefficient $C_s$ is of the order of 0.1%.

Figure 6:
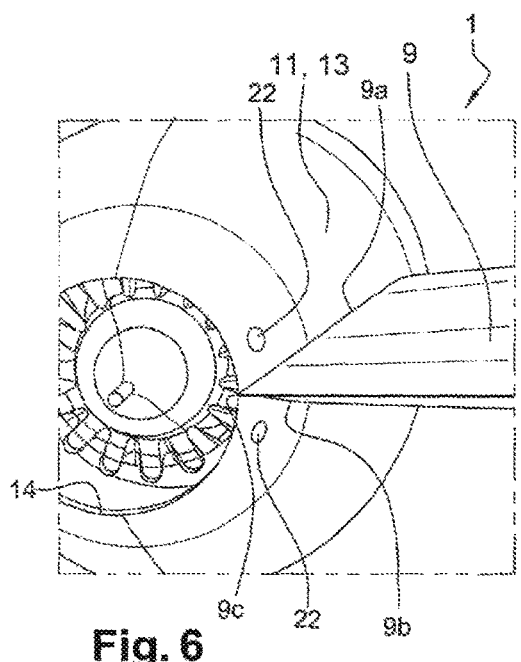
FIG. 6 is a perspective view of a portion of a nacelle in an embodiment of the invention.
Figure 7:
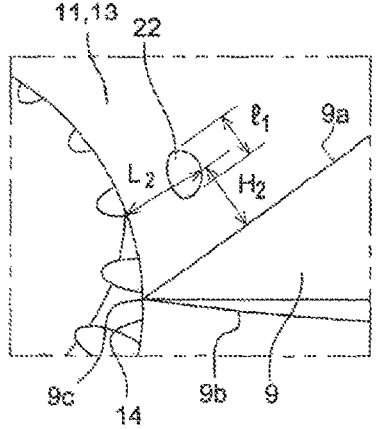
FIG. 7 is a detail perspective view, showing a downstream zone of the nacelle of the invention.
Figure 8:
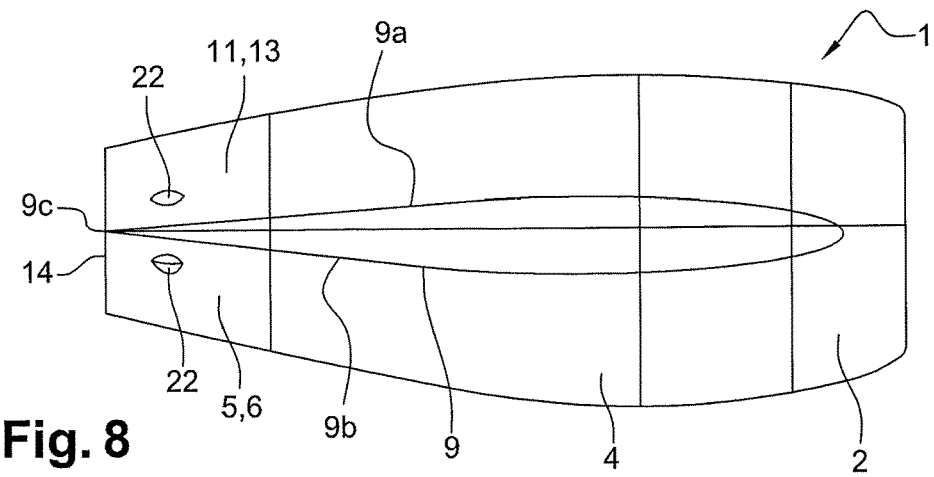
FIG. 8 is a side view of the nacelle of the invention.

Providing an axial distance L2 that is appropriate, i.e. lying in the range 0.3×M to 2×M, between the center of a projecting zone 22 and the downstream edge 14 of the outer wall 13, enables the constriction in the passageway for air to start at an axial position that is far enough upstream from the downstream edge 14 so that there is no separation of the boundary layer upstream from said axial position. It is also advantageous for the two side edges 9a, 9b of the two opposite sides of the pylon 9 to meet at an axial position 9c substantially at the level of axial position of the downstream edge 14 of the outer wall 13, in order to improve the overall air-flow performance downstream and starting from the projecting zones 22 on either side of the pylon 9 (FIGS. 6 to 8).

It should also be noted that these local deformations of the outer surface 13 are situated facing the hinges, as is shown in FIG. 10. Thus, due to the deformations 22, the space available for housing the hinges 16 is increased, which makes it possible to have hinges 16 that are more robust and more voluminous, and/or to place said hinges 16 closer to the tapered downstream edge 14.

The invention claimed is:

1. A nacelle for an aircraft turbojet, the nacelle comprising:
a frustoconical radially outer annular wall, and
a pylon extending radially outwards from said frustoconical radially outer annular wall, the pylon designed to fasten the nacelle to a fixed portion of an airplane, wherein said nacelle includes at least one projecting zone extending radially outwards from the frustoconical radially outer annular wall, wherein said projecting zone is situated in the vicinity of a downstream annular edge of said frustoconical radially outer annular wall and in the vicinity of the pylon, and wherein a distance between a center of the projecting zone and the pylon lies in a range of 0.15×M to 0.8×M, where M is a maximum cross-section or a maximum width of a streamlined section of the pylon at a zone attached to the frustoconical radially outer annular wall.

2. The nacelle according to claim 1, wherein said streamlined section extends along the axis of the nacelle.

3. The nacelle according to claim 1, wherein the axial distance between the projecting zone and the downstream edge of the frustoconical radially outer annular wall lies in a range of 0.3×M to 2×M.

4. The nacelle according to claim 2, wherein the maximum height of the projecting zone, along the normal to the frustoconical outer surface lies in a range of 0.03×M to 0.15×M, where M is the maximum cross section or maximum width of the streamlined section of the pylon at its zone attached to the outer wall.

5. The nacelle according to claim 2, wherein the length M, where M is the maximum cross section or maximum width of the streamlined cross section of the pylon at its zone attached to the outer wall.

6. The nacelle according to claim 2, wherein the width of the projecting zone lies in a range of 0.1×M to 0.5×M.

7. The nacelle according to claim 1, further comprising at least two projecting zones, situated circumferentially on either side of the pylon.

8. The nacelle according to claim 1, further comprising thrust reversal means comprising at least one door mounted to pivot about at least one hinge relative to a fixed portion of the nacelle, wherein, said hinge is housed between the frustoconical radially outer annular wall and an inner wall of the nacelle, facing the projecting zone.

9. The nacelle according to claim 8, wherein said frustoconical radially outer annular wall and said inner wall are frustoconical and meet at their downstream edges.

10. The nacelle according to claim 1, wherein a side surface of the pylon in the vicinity of the projecting zone has a substantially plane or convex shape, down to the downstream edge of the frustoconical radially outer annular wall.

11. The nacelle according to claim 1, wherein two side edges of the pylon meet at an axial position substantially at a level of an axial position of the downstream edge of said frustoconical radially outer annular wall.

12. The nacelle according to claim 1, wherein the distance between the center of the projecting zone and the pylon lies in the range in a range of 0.2×M to 0.7×M.

* * * * *